United States Patent
Nonaka et al.

(10) Patent No.: US 7,940,435 B2
(45) Date of Patent: May 10, 2011

(54) APPARATUS, METHOD AND PROGRAM FOR IMAGE DISPLAY

(75) Inventors: Shunichiro Nonaka, Asaka (JP); Shino Ogasawara, Kawasaki (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 800 days.

(21) Appl. No.: 11/723,654

(22) Filed: Mar. 21, 2007

(65) Prior Publication Data
US 2007/0223040 A1     Sep. 27, 2007

(30) Foreign Application Priority Data
Mar. 24, 2006     (JP) .................. 2006-083021

(51) Int. Cl.
G03F 3/10     (2006.01)
H04N 1/46     (2006.01)
(52) U.S. Cl. .......... 358/527; 358/1.9; 358/504; 358/537
(58) Field of Classification Search .................. 358/527, 358/1.9, 504, 518, 537; 382/224, 205, 225, 382/203, 305, 103, 130, 292, 187, 204, 173; 715/838, 784, 723; 707/7, 3, 5, 104.1, 100, 707/999.005, 999.104, 999.107, E17.009; 348/231.2, 333.05, 333.11, 231.4, 231.5; 345/810; 396/287; 1/1; 705/27
See application file for complete search history.

(56) References Cited

U.S. PATENT DOCUMENTS

| | | | |
|---|---|---|---|
| 6,301,586 B1 * | 10/2001 | Yang et al. | 1/1 |
| 6,606,411 B1 | 8/2003 | Loui et al. | |
| 6,865,297 B2 | 3/2005 | Loui et al. | |
| 7,437,005 B2 * | 10/2008 | Drucker et al. | 382/224 |
| 2003/0198390 A1 | 10/2003 | Loui et al. | |
| 2004/0024758 A1 * | 2/2004 | Iwasaki | 707/3 |
| 2004/0125150 A1 * | 7/2004 | Adcock et al. | 345/810 |
| 2004/0208365 A1 | 10/2004 | Loui et al. | |

FOREIGN PATENT DOCUMENTS

| | | |
|---|---|---|
| JP | 07-295873 | 11/1995 |
| JP | 2000-048181 | 2/2000 |
| JP | 2000-076281 | 3/2000 |
| JP | 2000-090113 | 3/2000 |
| JP | 2005-223854 | 8/2005 |

OTHER PUBLICATIONS

Japanese Office Action dated Nov. 2, 2010 (with partial English translation).

* cited by examiner

*Primary Examiner* — Charlotte M Baker
(74) *Attorney, Agent, or Firm* — McGinn IP Law Group, PLLC

(57) ABSTRACT

When images classified into groups of similar images are displayed, the similar images are efficiently displayed. For this purpose, a selection unit selects representative images representing the respective groups from the images classified into the groups. A display control unit displays a catalog of thumbnails of the representative images on display means. When a desired one of the representative images is selected in the catalog, a catalog of all the images in the group represented by the selected representative image is displayed on the display means, instead of the catalog of thumbnails of the representative images.

9 Claims, 5 Drawing Sheets

APPARATUS, METHOD AND PROGRAM FOR IMAGE DISPLAY

BACKGROUND OF THE INVENTION

1. Field of the Invention

The present invention relates to an image display apparatus and an image display method for displaying images classified into groups of similar images. The present invention also relates to a program that causes a computer to execute the image display method.

2. Description of the Related Art

Classification of images into a plurality of groups has been carried out according to information added to the images such as that indicating times of photography and photography locations (see Japanese Unexamined Patent Publication No. 2000-112997). Methods of image classification have also been proposed in Japanese Unexamined Patent Publication Nos. 2000-112997 and 2000-048181. In these methods, characteristic quantities such as colors, lightness, frequency information, and edge information are calculated for respective images, and an overall characteristic quantity is calculated by weighting the characteristic quantities. The overall characteristic quantity is compared among the images, and the images are classified into groups of similar images. Furthermore, a method of judgment has been proposed in Japanese Unexamined Patent Publication No. 2000-090113 wherein learning is carried out in advance employing similar images as learning patterns and whether two images are similar is judged based on a result of the learning.

However, although the methods described in Japanese Unexamined Patent Publication Nos. 2000-112997, 2000-048181 and 2000-090113 can classify images into groups of similar images, efficient display of the similar images cannot be realized by these methods.

SUMMARY OF THE INVENTION

The present invention has been conceived based on consideration of the above circumstances, and an object of the present invention is to efficiently display similar images.

A first image display apparatus of the present invention is an image display apparatus that displays images classified into groups of similar images, and the apparatus comprises:

display means for carrying out various kinds of display;

selection means for selecting representative images that represent the respective groups, from the images classified into the groups; and display control means for displaying a catalog of thumbnails of the representative images on the display means and for displaying, in the case where a desired one of the representative images is selected in the catalog, a catalog of all images in the group having the selected representative image, instead of the catalog of the thumbnails of the representative images on the display means.

In the first image display apparatus of the present invention, it is preferable for the catalog of the images to be a catalog of thumbnails of all the images in the group having the selected representative image.

A second image display apparatus of the present invention is an image display apparatus that displays images classified into groups of similar images, and the apparatus comprises:

display means for carrying out various kinds of display;

selection means for selecting representative images that represent the respective groups, from the images classified into the groups; and display control means for displaying a desired one of the representative images on the display means in the case where an instruction to display the representative image is input while adding to the representative image a mark representing that an image or images similar thereto is/are present if the group including the representative image has the similar image or images and for displaying on the display means a catalog of all the images in the group having the representative image in the case where an instruction to display the catalog is input.

In the second image display apparatus of the present invention, it is preferable for the catalog of the images to be a catalog of thumbnails of all the images in the group having the desired representative image.

A first image display method of the present invention is a method for displaying images classified into groups of similar images, and the method comprises the steps of:

selecting representative images that represent the respective groups, from the images classified into the groups; and displaying a catalog of thumbnails of the representative images on display means and for displaying, in the case where a desired one of the representative images is selected in the catalog, a catalog of all images in the group having the selected representative image, instead of the catalog of the thumbnails of the representative images on the display means.

A second image display method of the present invention is a method of displaying images classified into groups of similar images, and the method comprises the steps of:

selecting representative images that represent the respective groups, from the images classified into the groups; and displaying a desired one of the representative images on display means in the case where an instruction to display the representative image is input while adding to the representative image a mark representing that an image or images similar thereto is/are present if the group including the representative image has the similar image or images and for displaying on the display means a catalog of all the images in the group having the representative image in the case where an instruction to display the catalog is input.

The first and second image display methods of the present invention may be provided as programs that cause a computer to execute the methods.

According to the first image display apparatus and the first image display method of the present invention, the representative images representing the respective groups are selected from the images classified into the groups, and the catalog of the thumbnails of the representative images is displayed. When a desired one of the representative images is selected in the catalog, the catalog of all the images in the group having the selected representative image is displayed instead of the catalog of the thumbnails of the representative images. Therefore, once a user selects the desired representative image, the user can display the catalog of the images similar to the representative image. Consequently, display of the similar images can be carried out efficiently.

By displaying the catalog of the thumbnails of all the images in the group having the selected representative image as the catalog to be displayed at this time, the images similar to each other can be viewed at once.

According to the second image display apparatus and the second image display method of the present invention, in the case where the instruction to display the desired representative image is input, the representative image is displayed with the mark representing that the image or images similar to the representative image is/are present if the group represented by the representative image has the similar image or images.

In the case where the instruction is input to display the catalog of all the images in the group represented by the representative image, the catalog of all the images in the group is displayed. Therefore, a user can easily understand whether the representative image being displayed has the image or images similar thereto, by presence or absence of the mark. In addition, if the user inputs the instruction to display the catalog, the catalog of the images similar to the representative image can be displayed. Consequently, the images that are similar to each other can be efficiently displayed.

By displaying the catalog of the thumbnails of all the images in the group having the selected representative image as the catalog of the images, the similar images can be viewed at once.

DESCRIPTION OF THE PREFERRED EMBODIMENTS

Figure 1:
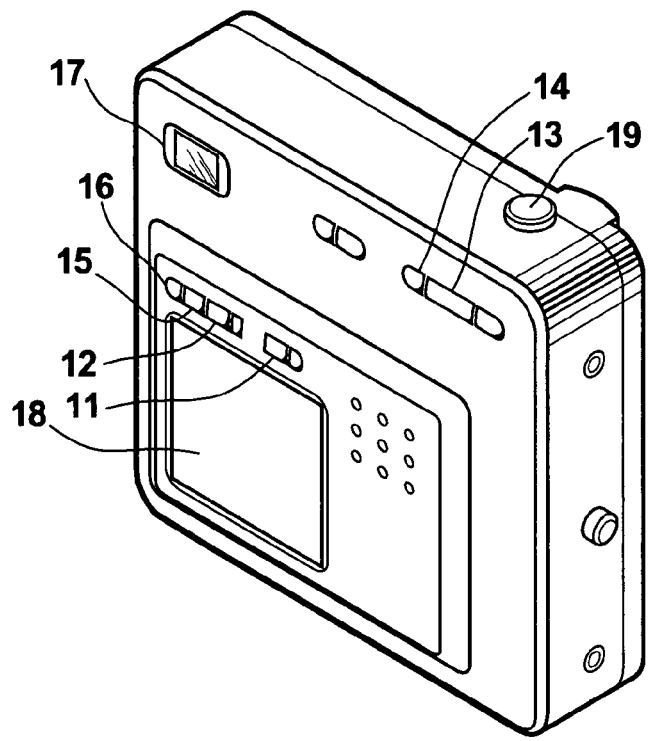
FIG. 1 is a perspective view of the rear of a digital camera adopting an image display apparatus of a first embodiment of the present invention.

Hereinafter, embodiments of the present invention will be described with reference to the accompanying drawings. FIG. 1 is a perspective view of the rear of a digital camera adopting an image display apparatus of a first embodiment of the present invention. As shown in FIG. 1, a digital camera 1 in this embodiment has an operation mode switch 11, a menu/OK button 12, a zoom/up-down lever 13, right-left buttons 14, a Back button 15, and a display change button 16, all of which serve as interfaces for operation by a photographer and are located at the rear thereof. In addition, the digital camera 1 has a viewfinder 17 and a liquid crystal monitor 18 at the rear thereof, in addition to a shutter button 19 on the upper side thereof.

Figure 2:
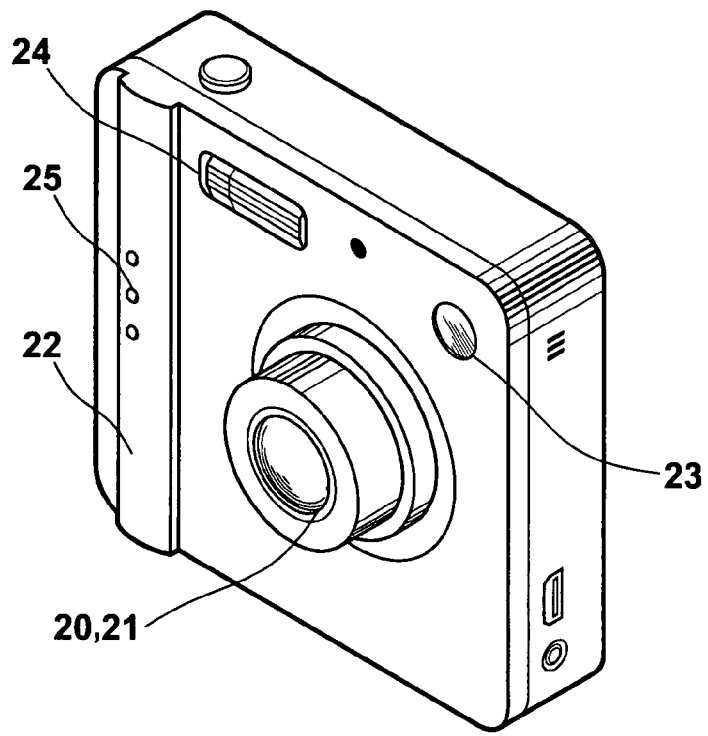
FIG. 2 is a perspective view of the front of the digital camera.

FIG. 2 is a perspective view of front of the digital camera 1. As shown in FIG. 2, the digital camera 1 has a photographing lens unit 20, a lens cover 21, a power switch 22, a viewfinder window 23, a flash 24, and a self-timer lamp 25 located on the front thereof.

Figure 3:
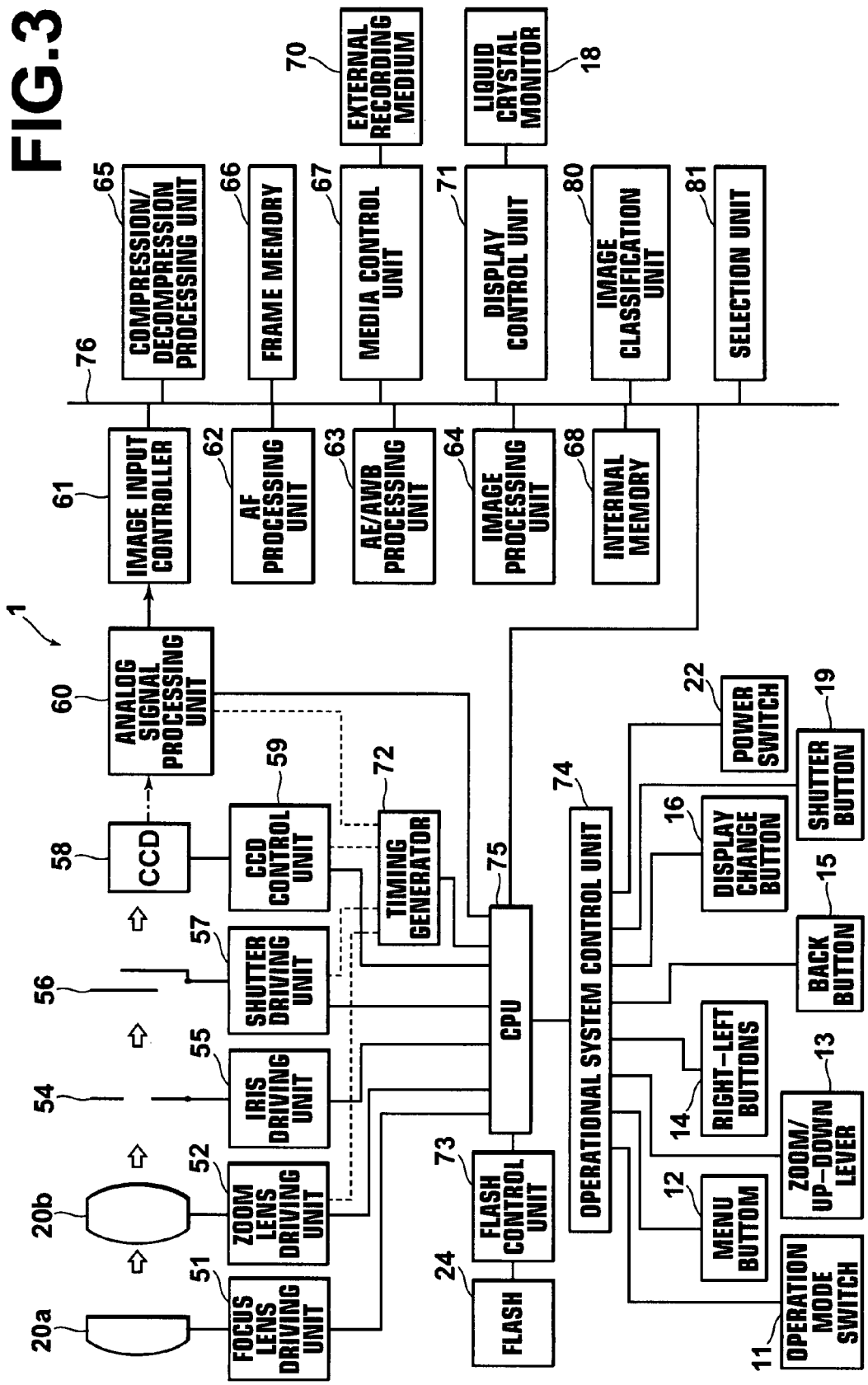
FIG. 3 is a block diagram showing the configuration of the digital camera.

FIG. 3 is a block diagram showing the configuration of the digital camera 1. The digital camera 1 shown in FIG. 3 converts image data obtained by photography into an image file of Exif format, and records the file in an external recording medium 70 that can be attached to and detached from the digital camera 1.

The digital camera 1 has an operational system including the operation mode switch 11, the menu/OK button 12, the zoom/up-down lever 13, the right-left buttons 14, the Back button 15, the display change button 16, the shutter button 19, and the power switch 22 described above. In addition, an operational system control unit 74 that functions as an interface for sending the contents of operations to a CPU 75 is also included in the operational system.

The digital camera 1 also has a focus lens 20a and a zoom lens 20b that constitute an optical system. The lenses can be moved in stepwise increments along an optical axis by a focus lens driving unit 51 and a zoom lens driving unit 52 each comprising a motor and a motor driver. The focus lens driving unit 51 and the zoom lens driving unit 52 control the stepwise movement of the corresponding lenses based on focus driving data output from an AF processing unit 62 and based on data representing operation of the zoom/up-down lever 13, respectively.

An iris 54 is driven by an iris driving unit 55 comprising a motor and a motor driver. The iris driving unit 55 adjusts a diameter of the iris 54 based on iris-value data output from an AE (Automatic Exposure)/AWB (Automatic White Balance) processing unit 63.

A shutter 56 is a mechanical shutter and driven by a shutter driving unit 57 comprising a motor and a motor driver. The shutter driving unit 57 opens and closes the shutter 56 according to a signal generated by pressing the shutter button 19 down and according to shutter speed data output from the AE/AWB processing unit 63.

A CCD 58 as an imaging device is located at the rear of the optical system. The CCD 58 has a photoelectric surface whereon a plurality of photoreceptor elements are arranged two-dimensionally. Light from a subject passing through the optical system forms an image on the surface and is subjected to photoelectric conversion. A micro-lens array for focusing the light on each pixel and a color filter array, wherein filters for R, G, and B colors are arranged regularly, are located in front of the photoelectric surface. The CCD 58 outputs an electric charge stored at each of the pixels as serial analog image signal for each line while synchronizing with a vertical transfer clock signal and a horizontal transfer clock signal supplied from a CCD control unit 59. The time during which the electric charge is stored at each of the pixels, that is, an exposure time is determined by an electronic shutter driving signal output from the CCD control unit 59. The CCD control unit 59 adjusts a gain of the analog image signal from the CCD 58 so as to obtain the signal of a predetermined magnitude.

The analog image signals from the CCD 58 are input to an analog signal processing unit 60. The analog signal processing unit 60 comprises a correlated double sampling (CDS) circuit for removing noise from the analog image signal, an automatic gain controller (AGC) for adjusting the gain of the analog image signal, and an A/D converter (ADC) for converting the analog image signal into a digital image signal. The image data converted into the digital image signal are CCD-RAW data having density values of R, G, and B for each of the pixels.

A timing generator 72 generates a timing signal. Feeding of the timing signal to the shutter driving unit 57, the CCD control unit 59, and the analog signal processing unit 60 synchronizes operation of the shutter button 19, the opening/closing of the shutter 56, input of the electric charge of the CCD 58, and processing by the analog signal processing unit 60.

A flash control unit 73 controls light emission from the flash 24.

An image input controller 61 writes the CCD-RAW data input from the analog signal processing unit 60 in a frame memory 66.

The frame memory 66 is a memory used as workspace for various kinds of digital image processing (signal processing) on the image data that will be described later.

A display control unit 71 is used to display the image data stored in the frame memory 66 as a throughput image on the liquid crystal monitor 18. In playback mode, the display control unit 71 also displays image data stored in the external recording medium 70 on the liquid crystal monitor 18.

The AF processing unit 62 and the AE/AWB processing unit 63 determine photography conditions based on a preliminary image. The preliminary image is an image represented by the image data stored in the frame memory 66 as a result of preliminary photography carried out by the CCD 58 instructed by the CPU 75 that has detected a half-press signal generated by half press of the shutter button 19.

The AE processing unit 62 detects a focal point position based on the preliminary image, and outputs the focus driving data (AF processing).

The AE/AWB processing unit 63 measures luminance of the subject based on the preliminary image, and determines an iris value, a shutter speed, and the like based on the luminance. The AE/AWB processing unit then outputs the data of the iris value and the shutter speed as exposure setting values (AE processing), and automatically adjusts white balance at the time of photography (AWB processing).

An image processing unit 64 carries out image quality enhancement processing such as Gamma correction, sharpness correction, and contrast correction on data of a final image. The image processing unit 64 also carries out YC processing to convert the CCD-RAW data into YC data comprising Y data as a luminance signal, Cb data as a blue color difference signal, and Cr data as a red color difference signal. The final image is an image based on the image data input from the CCD 58 and stored in the frame memory 66 via the analog signal processing unit 60 and the image input controller 61, in actual photography carried out by full press of the shutter button 19.

A compression/decompression unit 65 carries out compression processing in a format such as JPEG on the final image data having been subjected to the image enhancement processing and the conversion by the image processing unit 64, and generates the image file. A tag storing accompanying information such as time and date of photography is added to the image file according to the Exif format or the like. The compression/decompression unit 65 also reads a compressed image file from the external recording medium 70 in the playback mode, and carries out decompression processing thereon. The decompressed image data are output to the liquid crystal monitor 18.

A media control unit 67 controls image-file reading and writing by accessing the external recording medium 70.

An internal memory 68 stores various kinds of constants set in the digital camera 1, a program executed by the CPU 75, and the like.

An image classification unit 80 classifies images stored in the external recording medium 70 into groups of similar images. Any method may be used as a method of the classification, including the methods described in Japanese Unexamined Patent Publication Nos. 2000-112997, 2000-048181 and 2000-090113. For images that do not have any similar images, the image classification unit 80 classifies the images as respective groups solely comprising the images.

A selection unit 81 selects representative images that represent the respective groups into which the images have been classified by the image classification unit 80. Each of the representative images is an image that represents images included in the corresponding group, and the image having the latest or earliest photography time therein or an image selected randomly may be used as the representative image, for example.

The CPU 75 controls each of the units in the digital camera 1 according to the signals from each of the processing units such as the AF processing unit 62 and from the operational system such as the operation mode switch 11.

A data bus 76 is connected to the image input controller 61, the processing units 62 to 65, the frame memory 66, the media control unit 67, the internal memory 68, the display control unit 71, the image classification unit 80, the selection unit 81, and the CPU 75, and exchanges the image data and various kinds of instructions.

Figure 4:
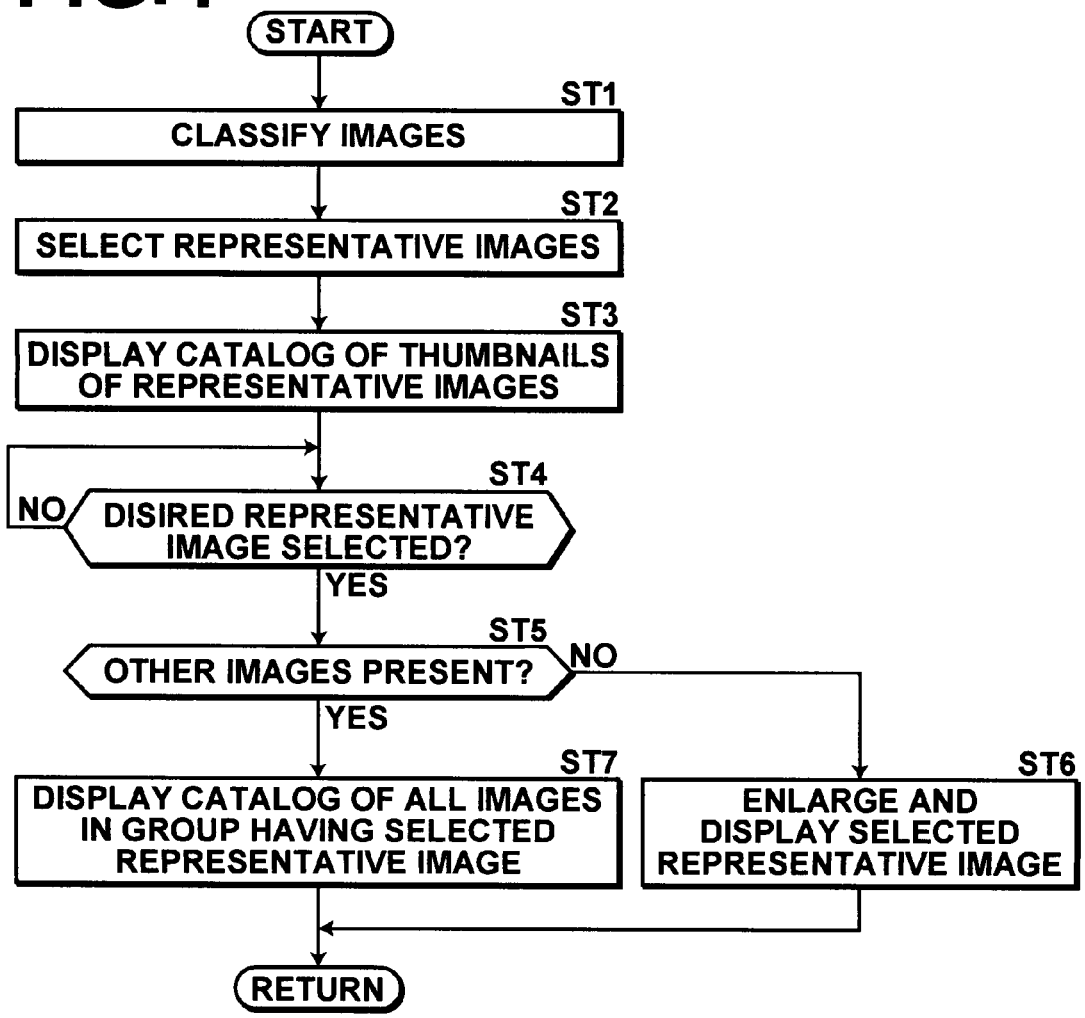
FIG. 4 is a flow chart showing procedures carried out in the first embodiment.

Procedures carried out in the digital camera 1 having the above configuration will be described below. FIG. 4 is a flow chart showing the procedures. In the first embodiment, the images have been obtained by photography and stored in the external recording medium 70.

Figure 5:
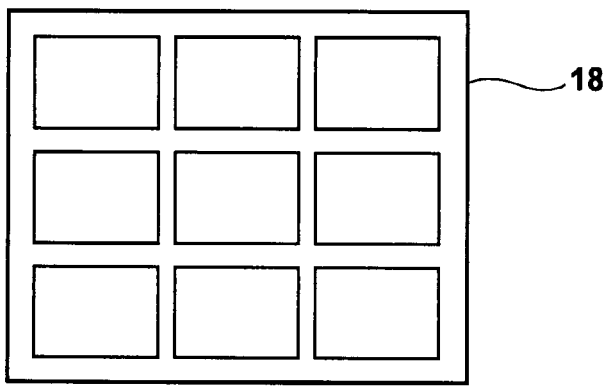
FIG. 5 shows a liquid crystal monitor in which a catalog of thumbnails is displayed.
Figure 6:
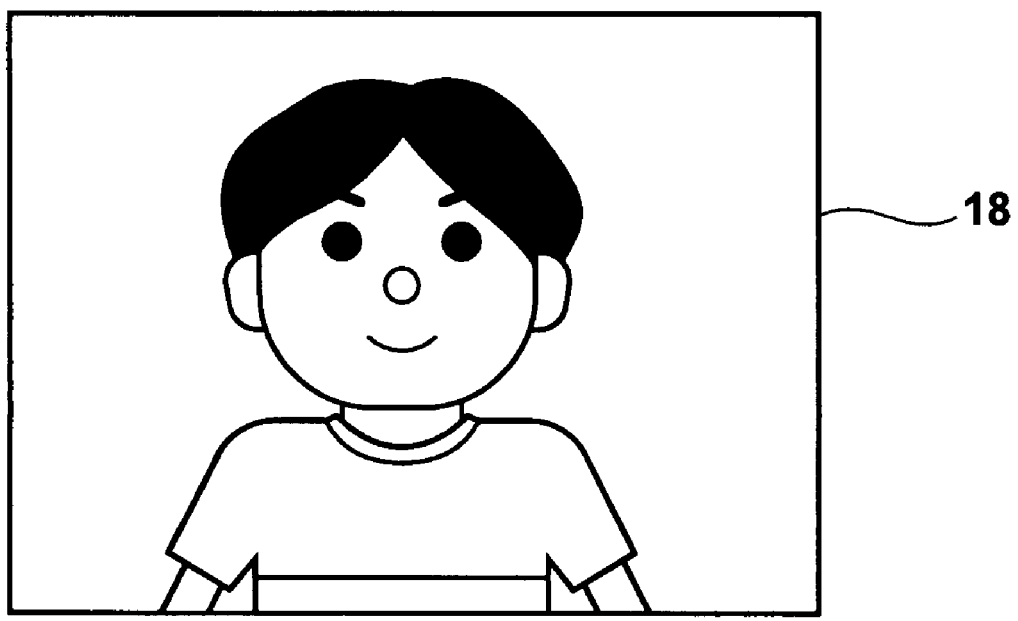
FIG. 6 shows the liquid crystal monitor in which a selected image is displayed by being enlarged.

When a user inputs a similar-image classification instruction after changing the digital camera 1 to the playback mode, the image classification unit 80 classifies the images stored in the external recording medium 70 into the groups of similar images (Step ST1). The selection unit 81 then selects the representative images that represent the respective groups (Step ST2). The display control unit 71 displays a catalog of thumbnails of the representative images on the liquid crystal monitor 18, as shown in FIG. 5 (Step ST3).

The display control unit 71 starts monitoring whether a desired one of the representative images has been selected (Step ST4). If a result at Step ST4 is affirmative, judgment is made as to whether the group represented by the selected representative image has images other then the representative image (Step ST5). If a result at Step ST5 is negative, the display control unit 71 enlarges and displays the selected representative image on the liquid crystal monitor 18 (Step ST6), and the flow of processing returns. If the result at Step ST5 is affirmative, the display control unit 71 displays on the liquid crystal monitor 18 a catalog of thumbnails of all the images in the group having the selected representative image as shown in FIG. 7 (Step ST7), and the flow of processing returns.

Figure 7:
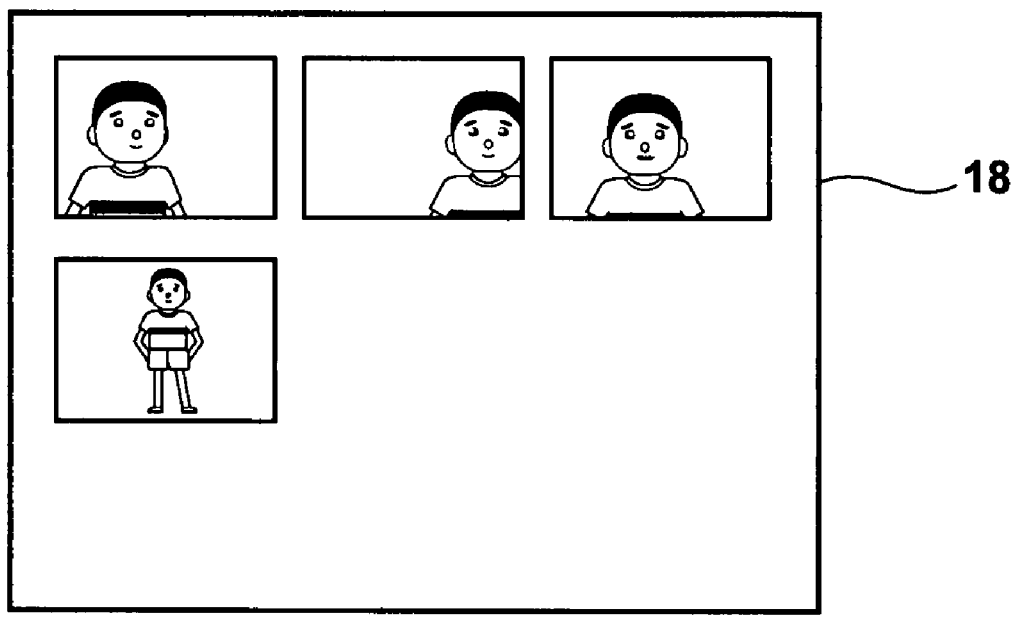
FIG. 7 shows the liquid crystal monitor in which thumbnails of all images in a group having the selected image is displayed.

If the user selects a desired one of the images in the catalog of thumbnails shown in FIG. 7, the selected image is enlarged and displayed.

As has been described above, in the first embodiment, the representative images representing the respective groups are selected from the images classified into the groups, and the catalog of thumbnails of the representative images is displayed. When a desired one of the representative images is selected in the catalog, the catalog of all the images in the group having the selected representative image is displayed. Therefore, by only selecting the representative image, the user can display the catalog of the images similar to the representative image. Consequently, the similar images can be displayed efficiently.

In the case where any one of the representative images is deleted in the catalog of thumbnails shown in FIG. 5, all the images in the group represented by the deleted representative image may be deleted. In this manner, an operation for deleting unnecessary images becomes easier.

A second embodiment of the present invention will be described next. In the second embodiment, only processing carried out by a display control unit 71 is different from the first embodiment, and the configuration of the second embodiment is the same as the first embodiment. Therefore, detailed description thereof is omitted.

Figure 8:
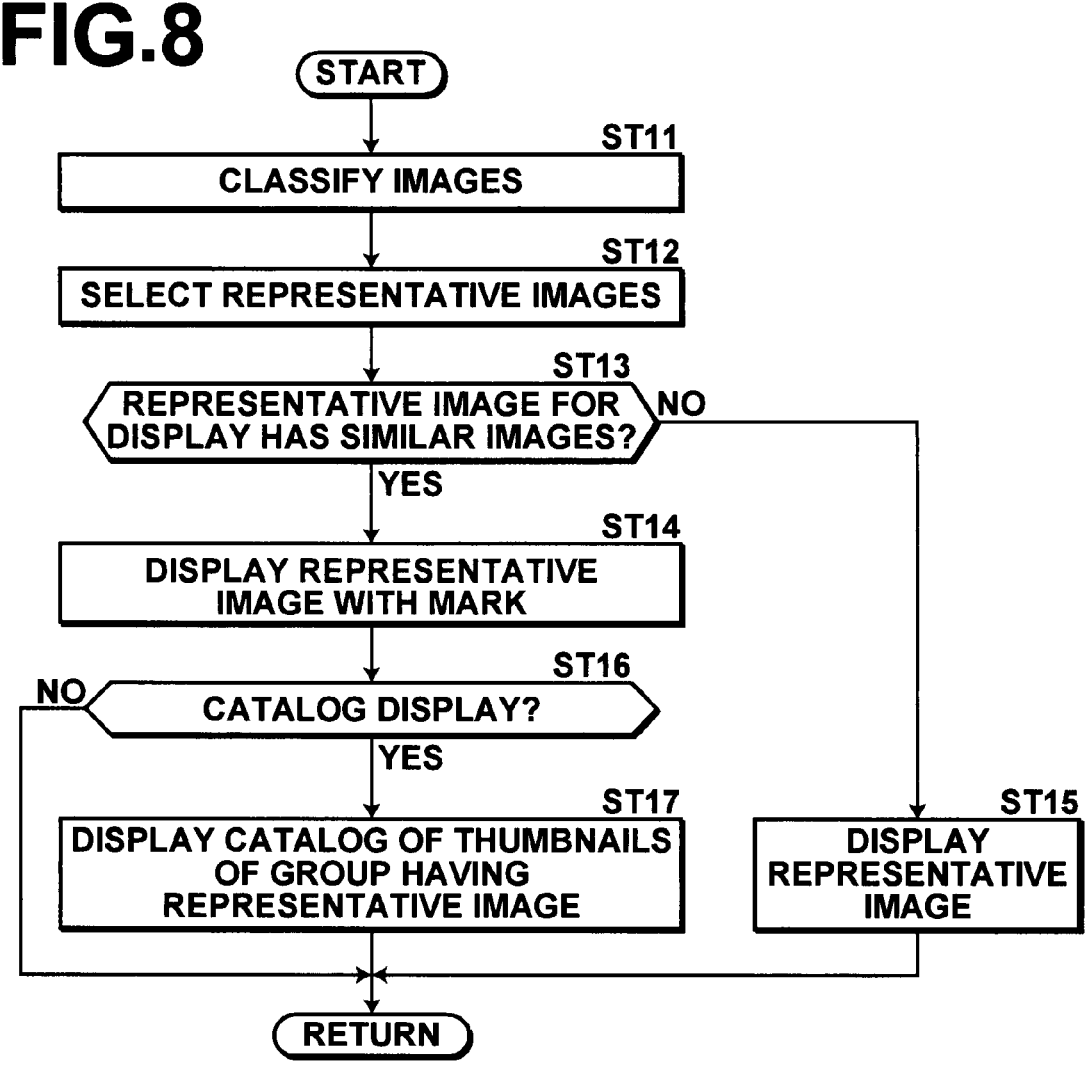
FIG. 8 is a flow chart showing procedures carried out in a second embodiment of the present invention.

FIG. 8 is a flow chart showing procedures carried out in the second embodiment. In the second embodiment, images have been obtained by photography and stored in an external recording medium 70.

When a user inputs a similar-image classification instruction after changing a digital camera 1 to playback mode, an image classification unit 80 classifies the images stored in the external recording medium 70 into groups of similar images (Step ST11). A selection unit 81 then selects representative images that represent the respective groups (Step ST12). The display control unit 71 judges presence or absence of an image or images similar to a selected one of the representative images to be displayed (hereinafter referred to as the similar images) on a liquid crystal monitor 18 (Step ST13).

Figure 9:
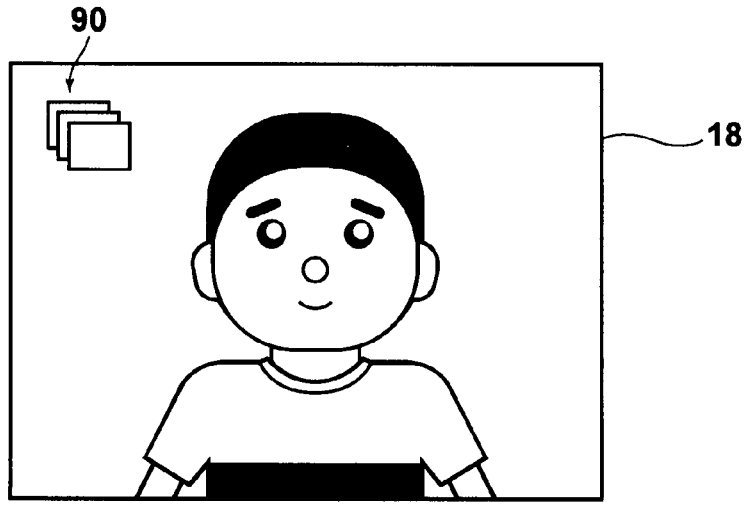
FIG. 9 shows a state wherein a mark representing presence of similar images is added.

If a result at Step ST13 is affirmative, the display control unit 71 displays on the liquid crystal monitor 18 the selected representative image with a mark 90 representing presence of the similar images, as shown in FIG. 9 (Step ST14). If the result at Step ST13 is negative, the selected representative image is displayed as it is on the liquid crystal monitor 18 (Step ST15), and the flow of processing returns.

After Step ST14, the display control unit 71 starts monitoring whether a catalog display instruction has been input (Step ST16). If a result at Step ST16 is affirmative, a catalog of thumbnails of all the images in the group represented by the representative image is displayed on the liquid crystal monitor 18 (Step ST17), and the flow of processing returns.

As has been described above, in the second embodiment, the representative images representing the respective groups are selected from the images classified into the groups. When the instruction to display a desired one of the representative images is input, the representative image is displayed with the mark 90 representing presence of the similar images. Therefore, presence or absence of the mark 90 can let the user easily recognize presence or absence of the similar images to the displayed representative image.

If the catalog display instruction is input when the image having the mark 90 is being displayed, the catalog of the similar images to the representative image can be displayed. Consequently, the similar images can be displayed efficiently.

In the case where the representative image displayed with the mark 90 as shown in FIG. 9 is deleted, all the images in the group represented by the representative image may be deleted. In this manner, an operation for deleting unnecessary images becomes easier.

Although the apparatuses of the embodiments of the present invention have been described above, programs causing a computer to function as means corresponding to the image classification unit 80, the selection unit 81, and the display control unit 71 and to carry out the procedures shown in FIGS. 4 and 8 are also embodiments of the present invention. Computer-readable recording media storing such programs therein are also embodiments of the present invention. The programs may be incorporated into viewer software for image viewing.

What is claimed is:

1. An image display apparatus for displaying images classified into groups of similar images, the apparatus comprising:
   display means for carrying out various kinds of display;
   selection means for selecting representative images representing respective groups, from the images classified into the groups; and
   display control means for displaying a desired one of the representative images on the display means in a case where an instruction to display a representative image is input while adding to the representative image a mark representing that an image or images similar thereto is/are present if a group including the representative image has a similar image or images, and for displaying on the display means a catalog of all images in the group having the representative image in a case where an instruction to display the catalog is input,
   wherein, when the representative image displayed with the mark is deleted, said all images in the group having the representative image are deleted.

2. The image display apparatus according to claim 1, wherein the catalog of the images comprises a catalog of thumbnails of all the images in the group having the desired representative image.

3. The image display apparatus according to claim 1, further comprising:
   image classification means for classifying images stored in an external recording medium into said groups of similar images, said display means displaying said images classified into said groups of similar images.

4. The image display apparatus according to claim 3, wherein said image classification means classifies images that lack the similar images as a part of said respective groups.

5. An image display method for displaying images classified into groups of similar images, the method comprising:
   selecting representative images representing respective groups, from the images classified into the groups; and
   displaying a desired one of the representative images on display means in a case where an instruction to display a representative image is input while adding to the representative image a mark representing that an image or images similar thereto is/are present if a group including the representative image has a similar image or images, and displaying on the display means a catalog of all images in the group having the representative image in a case where an instruction to display the catalog is input,
   wherein, when the representative image displayed with the mark is deleted, said all images in the group having the representative image are deleted.

6. The image display method according to claim 5, further comprising:
   classifying images stored in an external recording medium into said groups of similar images, said display means displaying said images classified into said groups of similar images.

7. The image display method according to claim 6, wherein said classifying images comprises classifying images that lack the similar images as a part of said respective groups.

8. A computer-readable storage medium encoded with a computer program causing a computer to execute an image display method for displaying images classified into groups of similar images, the program comprising:
   selecting representative images representing respective groups, from the images classified into the groups; and
   displaying a desired one of the representative images on display means in a case where an instruction to display a representative image is input while adding to the representative image a mark representing that an image or images similar thereto is/are present if a group including the representative image has a similar image or images, and displaying on the display means a catalog of all images in the group having the representative image in a case where an instruction to display the catalog is input, wherein, when the representative image displayed with the mark is deleted, said all images in the group having representative image are deleted.

9. The computer-readable storage medium according to claim 8, wherein said program further comprises:
classifying images stored in an external recording medium into said groups of similar images, said display means displaying said images classified into said groups of similar images.

* * * * *